United States Patent [19]

Vaclavik

[11] Patent Number: 4,899,379
[45] Date of Patent: Feb. 6, 1990

[54] CIRCUIT ARRANGEMENT FOR THE CONNECTION OF LINE CIRCUITS OF A DIGITAL TIME MULTIPLEX-TELEPHONE NETWORK

[75] Inventor: Peter Vaclavik, Munich, Fed. Rep. of Germany

[73] Assignee: Siemens Aktiengesellschaft, Berlin and Munich, Fed. Rep. of Germany

[21] Appl. No.: 366,273

[22] Filed: Jun. 12, 1989

Related U.S. Application Data

[63] Continuation of Ser. No. 20,814, Mar. 2, 1987, abandoned.

[30] Foreign Application Priority Data

Apr. 23, 1986 [DE] Fed. Rep. of Germany ....... 3613715

[51] Int. Cl.⁴ .......................... H04M 3/22; H04M 7/14
[52] U.S. Cl. ...................................... 379/377; 379/380; 379/240

[58] Field of Search ............... 379/240, 377, 252, 229, 379/399, 382, 384, 236, 380, 383, 182, 183; 370/58–68.1

[56] References Cited

U.S. PATENT DOCUMENTS

| 4,099,032 | 7/1978 | Roge et al. ..................... 379/380 X |
| 4,228,536 | 10/1980 | Gueldenpfennig et al. .......... 370/66 |
| 4,297,531 | 10/1981 | Dalhof et al. .................... 379/377 X |
| 4,535,201 | 8/1985 | Kasbia et al. ....................... 379/377 |
| 4,689,816 | 8/1987 | Wood .................................. 379/382 |

FOREIGN PATENT DOCUMENTS

| 0003363 | 1/1983 | Japan ................................... 379/382 |
| 86/02795 | 5/0986 | World Int. Prop. O. .......... 379/382 |

Primary Examiner—Jin F. Ng
Assistant Examiner—Randall S. Vaas
Attorney, Agent, or Firm—David N. Caracappa

[57] ABSTRACT

A circuit for implementing a connection of an operational amplifier, and for achieving the switchable sensitivity of the same, as well as the in-and-out switchable filter elements, which results in a low cost, universally applicable line circuit interconnect circuit.

2 Claims, 1 Drawing Sheet

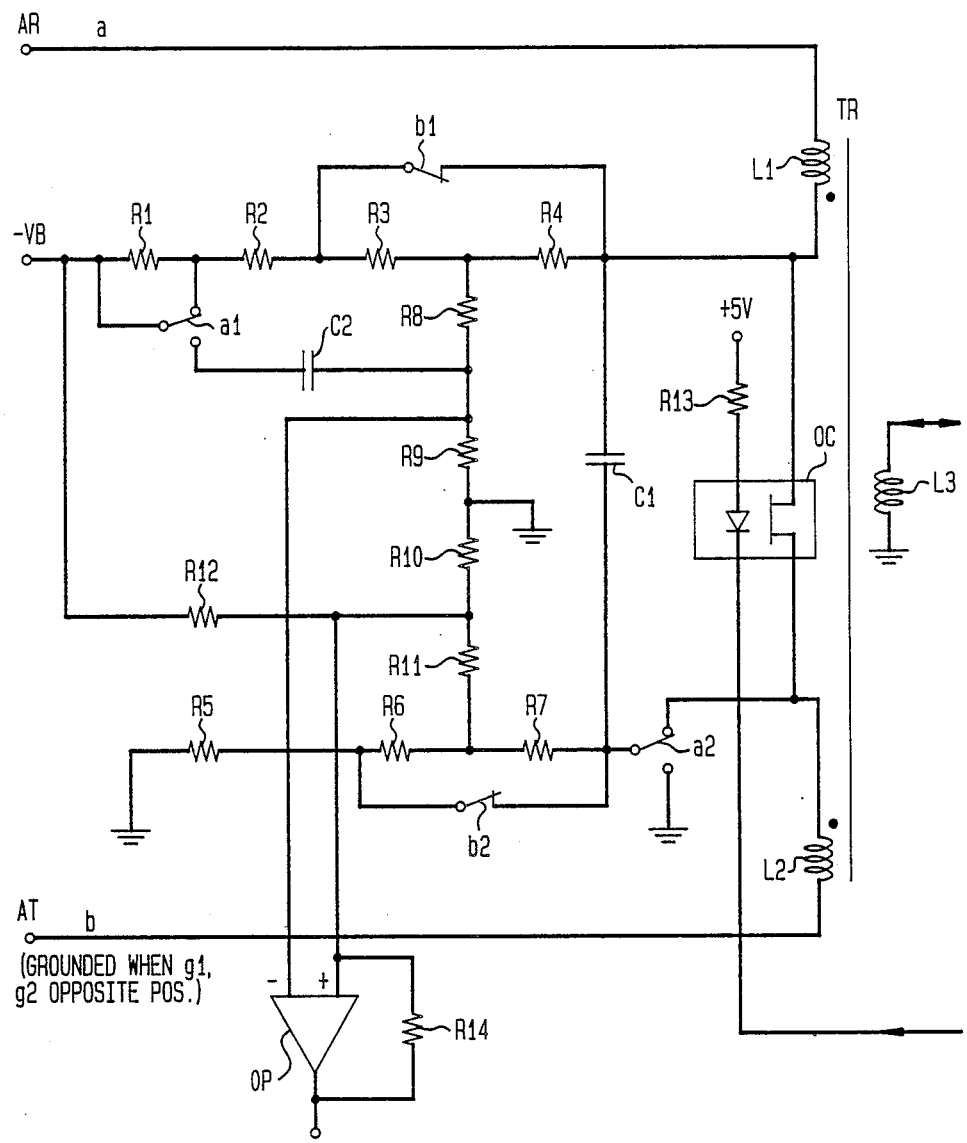

CIRCUIT ARRANGEMENT FOR THE CONNECTION OF LINE CIRCUITS OF A DIGITAL TIME MULTIPLEX-TELEPHONE NETWORK

CROSS REFERENCE TO RELATED APPLICATIONS

This application is a continuation of application Ser. No. 07/020,814, filed 3/2/87, now abandoned.

1. Robert Lechner, et al. case VPA 86 P 1245 US, Protective Circuit For The Overvoltage Protection of a Subscriber Line Interconnect Circuit; filed on even date herewith.

2. Robert Lechner, et al. case VPA 86 P 1246 US, Protective Circuit for the Overlap Protection of a Subscriber Line Interconnect Circuit; filed on even date herewith.

BACKGROUND OF THE INVENTION

1. Field of the Invention

The present invention relates generally to the connection of line circuits of a digital time-multiplex telephone network, and more specifically to an interconnect circuit which provides an indication of line conditions.

2. Description of the Prior Art

It is known to be desirable to have a universally applicable interconnect circuit which, under differing line conditions also requires different types of indications of such conditions. Thus, it is desirable in such an interconnect circuit to present a subscriber line circuit loop/closure caused by an off-hook indication, as well as a ground potential indication within the scope of signaling between a local exchange and a branch exchange by the application of ground potential to one core conductor of a central office line at a particular switching circuit configuration at the central office. As far as a connection for a subscriber line for a dual service connection of an interconnect line is concerned, a corresponding indication of a subscriber off-hook condition is desirable.

There is an overriding requirement of a line indication of insensitivity to pick-up of alternating current noise voltages, especially network power line a.c. noise voltages.

With regard to the above known requirements, interconnect circuits have been developed in the prior art which provided separate indication circuits for loop closure indication, and for ground potential indication and/or indication of an off-hook condition produced by a subscriber of a dual service connection.

SUMMARY OF THE INVENTION

The present invention is a universally applicable interconnect circuit suited to the foregoing requirements, at minimized expense.

This is accomplished in a line circuit, according to the invention by means of an indicator circuit coupled to the core conductors of the line circuit via voltage dividers, which serve both for loop closure indication as well as for ground potential indication on one of the core pair conductors, in the course of corresponding signaling. In a subscriber presented off-hook condition where a common subscriber line circuit of a dual service connection is involved, the resistances for the line circuit included in the supply circuit and the voltage divider resistances are so selected that the a.c. noise voltages picked up by the core pair conductors are cancelled at the inputs to the indication circuit. Additional switching means are provided whereby a resistance may be inserted into that core conductor in which the ground potential measurement is made, during the ground potential indication. The resistance is so selected that it produces an increased sensitivity of the indication circuit for this type of indication. At least one of the filter circuits connected to the core conductor operates to prevent the a.c. noise voltages from affecting the indication circuit. The other core pair conductor of the line circuit is isolated from the indicator circuit and is at ground potential. A second switching means is provided through which both core pair conductors of the line circuit may be shunted in the line interconnect circuit with low resistance during the subscriber indication.

The circuit arrangement according to the invention is capable of carrying out several of the above indications without the need for additional indication circuits. Despite the different circuit conditions during loop indication and during ground potential indication and the subscriber indication of a subscriber off-hook condition on a dual service connection, the requirement of insensitivity to noise is met, according to the invention, in one embodiment by the selection of equally dimensioned line branches to which the indicator circuit is connected, and in the case of the other types of indications presented by a line condition for which this equality no longer holds, through the effect of the switched filter circuits. Because of the in-and-out switchability of the filters, dial pulses generated during dialing operation are not distorted.

A further embodiment of the invention describes the technique insertion of current limiting resistances into the core pair of the line circuit in the event of an established, unacceptably high current in the line circuit. When this technique is employed instead of disconnecting the interconnect circuit from the line circuit, the indicator circuit may, additionally, be used to indicate contact of the line circuit by power line voltage due to a malfunction.

BRIEF DESCRIPTION OF THE DRAWING

FIG. 1 is an interconnect circuit in accordance with the invention.

DESCRIPTION OF THE PREFERRED EMBODIMENT

FIG. 1 shows an interconnect circuit for connection to a two conductor core line circuit, the core conductors of which are connected to the terminals AR and AT. Depending upon the application, these line circuits may couple a subscriber line circuit to a subscriber station and or dual subscriber stations of a dual service connection, and also may couple a line circuit through which a branch exchange communicates with a switching center of the public telephone network. The circuit shown may therefore be included either as a part of a public switching center or in a branch exchange installation.

The terminals AR and AT are connected via the windings L1 and/or L2 of a speech transformer TR, over the third winding L3 of which speech signals reach elements of the switching center that are not shown, u.o. Its coupling area, as well as a series of resistances is connected to the poles of a current supply source, of which one is at ground potential and the other is at the potential −VB of the operating voltage source. Of the resistances R1 through R4 which are connected between the terminal AR and potential −VB of the supply current source, resistances R3 and R4 may be shunted at low resistance by contact b1 of a relay B. The resistance R4 is of relatively high ohmic resistance. The resistance R1 may be shunted at low resistance by the make-break contact a1 of a relay A.

Of the resistances R5 through R7 which are connected between the terminal AT and the grounded pole of the voltage supply source, the relatively high ohmic resistance R6 and the resistance R7 may be shunted at low resistance by contact b2 of the relay B. In addition, this part of the supply circuit may be isolated from the circuit arrangement leading to the terminal AT by the contact a2 of the said relay A, which is also a make-break contact, and instead, may be switched to a grounded terminal of the circuit.

A voltage divider consisting of the resistances R8 and R9 and/or the resistances R10 and R11 is connected between the resistances R3 and R4 and/or the resistances R6 and R7 and a grounded point of the circuit. The junction of R8/R9 is connected to the inverted input, the junction of R10/R11 to the non-inverted input, of an operational amplifier OP which represents the indication circuit. Additionally, the junction point of the voltage divider R10/R11 is tied to a terminal leading to the −VB terminal of the current supply source through a resistance R12.

A capacitor C2 may be switched into the circuit between the junction of R8/R9 of the voltage divider and the last mentioned terminal of the current supply source by means of the make-break contact of relay A.

An additional capacitor C1 is connected between the junction of the resistance R4 and the transformer winding L1 and/or the junction of the resistance R7 and the transformer coil winding L2. Parallel with the aforementioned components is an electronic switch OC, the lower connection point of which is connected to the make-break contact coupled to the resistance R7. Electronic switch OC is preferably an opto-electronic switch.

In an operating mode during which a possible loop closure indication is to be presented, the make-break contacts a1 and a2 of the relay A, are in the switched position shown in FIG. 1. The resistance R1 is shunted at low resistance and the terminal AT of the circuit, to which one core conductor of the line circuit is connected is at ground potential via the resistance R5. The values of resistances R2, R8 and R9, as well as the resistances R5, R11, R10 and R12 are selected so that the total resistance present between the terminal point AT, and between the terminal point AR, and a grounded point of the circuit are equal. Alternating current noise picked up by the core conductors of the interconnect circuit thus reach the inputs of the indicator circuit OP with equal amplitude and therefore cannot effect the output signal of the indicator circuit.

A loop closure of the line circuit will result in a relatively low resistance connection between the terminal points AR and AT, and there will be a polarity reversal of the voltage between the junction points of the voltage dividers R8/R9 and R10/R11 which will result in a potential change in the output of the operational amplifier OP which is utilized as a loop closure signal.

When the contacts a1 and a2 of the relay A are in the switched position opposite to that illustrated by FIG. 1, the resistance R1 is inserted in the current supply circuit, and the core conductor of the line circuit connected to the terminal AT is isolated from the remaining circuit arrangement and placed directly at ground potential. This causes the circuit to be in a switched position in which, during the course of applicable signaling between a branch exchange of a public network, and a local exchange in which one of the core conductors is placed at ground potential, it may be employed to indicate the ground potential. The rise in the resistance which is connected between the terminal AR, and the terminal of the voltage supply source exhibiting the potential −VB around the resistance R1, corresponds to the necessary rise in the resistance of one of the core conductors, for this signaling state, and to the rise in sensitivity of the indicator circuit that is necessary for this type of indication.

In the condition presented by the other switching position of the contact a1, the capacitor C2 is now connected between the junction point of R8/R9 of the voltage divider and ground potential, through the voltage supply source, and together with the resistance R8 forms a low pass filter which prevents the indicator circuit from being affected by alternating current pickup in the line circuit. The same effect is provided by the winding L1 together with the capacitor C1, one side of which is now at ground potential.

When the circuit is used to connect a subscriber line circuit of a dual service connection, the contacts a1 and a2 are again in the switching position opposite to that shown by FIG. 1. Moreover, the core conductors connected to the terminations AR and AT are now shunted with low resistance by the electronic switch OC. When ground potential is identified, by the indicator circuit, on the core conductor connected to AR, this is an indication that a positive off-hook condition has originated with a specific subscriber station of the dual service connection, whereas the absence of ground potential on the core conductor indicates that an off-hook condition has originated from the other specific subscriber station. The value of the resistance R1 is such that the corresponding response sensitivitiy of the operational amplifier OP is provided for this indication mode as well.

When an over-current in the line circuit caused by a malfunction condition is established by a separate device (not shown), this will lead, in the circuit according to the invention, to the actuation of Relay B and therewith to opening contacts b1 and b2, so that the resistances R3 and R4 and/or R6 and R7 are inserted into the current supply circuit, and because of the relatively high resistance values of resistances R4 and R7, a limitation of loop current is achieved.

When over-current malfunction is caused by alternating power line voltage between the core conductors of the line circuit, the circuit according to the invention, may use the indication circuit OP to indicate this failure mode, since its output signal will pulsate at power line frequency despite the filtering effect of the circuit components R8/C2 and/or L1.

During the operating condition "Dial", the relay A is not pulled in, and the switch OC is open, so that with a closed loop of the line circuit, there is no distortion of the dial impulses.

What is claimed is:

1. A circuit arrangement for coupling a telephone line circuit, having core conductors, to any one of: a subscriber station; dual subscriber stations of a dual service connection; and a branch exchange; said circuit arrangement comprising:

a detector circuit coupled by a voltage divider circuit to said core conductors of said telephone line circuit, to selectively provide one of: a loop closure indication of said telephone line circuit; a ground potential indication on one of said core conductors of said telephone line circuit for telephone signaling; and an off-hook indication for one of said dual subscriber stations in said dual service connection; in response to a control signal, whereby the voltage divider includes resistances of such value that alternating current noise voltages coupled into said core conductors compensate each other at the input of the detector circuit;

first switching means by which a resistance is inserted into one of said core conductors on which a ground potential indication occurs, during said ground potential indication and said off-hook indication, of such magnitude to provide a higher sensitivity of said detector circuit required for such indication and for activating at least one filter circuit to prevent the effects of the said alternating current noise voltages upon said detector circuit, and through which switching means another conductor of said core conductors of said telephone line circuit is isolated at ground potential from the detector circuit; and second switching means for shunting said core conductors of said telephone line circuit with a low resistance.

2. A circuit according to claim 1, further including:

third switching means through which current limiting resistances are switched into said core conductors in the event of the presence of an increased current in the telephone line circuit indicated by said detector circuit.

* * * * *